(12) United States Patent
Swainston

(10) Patent No.: US 9,325,573 B2
(45) Date of Patent: Apr. 26, 2016

(54) BUILDING CONTROL SYSTEM

(75) Inventor: Michael Johnson Swainston, Mechanicsville, VA (US)

(73) Assignee: Schneider Electric Buildings AB, Malmo (SE)

( * ) Notice: Subject to any disclaimer, the term of this patent is extended or adjusted under 35 U.S.C. 154(b) by 991 days.

(21) Appl. No.: 12/330,988

(22) Filed: Dec. 9, 2008

(65) Prior Publication Data
US 2010/0142535 A1 Jun. 10, 2010

(51) Int. Cl.
*H04L 12/24* (2006.01)
*H04L 12/28* (2006.01)
*H04L 29/12* (2006.01)

(52) U.S. Cl.
CPC ........ *H04L 41/0806* (2013.01); *H04L 12/2809* (2013.01); *H04L 29/12254* (2013.01); *H04L 61/2038* (2013.01)

(58) Field of Classification Search
CPC ............ H04L 41/0806; H04L 12/2809; H04L 29/12254; H04L 61/2038
See application file for complete search history.

(56) References Cited

U.S. PATENT DOCUMENTS

| | | | |
|---|---|---|---|
| 5,916,306 A | 6/1999 | Ruiz | |
| 6,388,399 B1 | 5/2002 | Eckel et al. | |
| 6,571,140 B1 | 5/2003 | Wewalaarachchi et al. | |
| 6,665,730 B1 * | 12/2003 | Michelson | H04L 45/10 709/205 |
| 6,829,513 B2 | 12/2004 | Piersanti et al. | |
| 7,219,141 B2 | 5/2007 | Bonasia et al. | |
| 7,265,669 B2 | 9/2007 | Call et al. | |
| 7,302,313 B2 * | 11/2007 | Sharp | G01N 1/26 700/275 |
| 7,483,403 B2 * | 1/2009 | Herrmann | H04L 12/12 370/254 |
| 7,889,051 B1 * | 2/2011 | Billig | H04L 12/2818 340/286.01 |
| 2003/0078677 A1 * | 4/2003 | Hull | G05B 15/02 700/1 |
| 2005/0260996 A1 * | 11/2005 | Groenendaal | H04L 63/102 455/445 |
| 2006/0224711 A1 | 10/2006 | Engel et al. | |
| 2007/0043476 A1 * | 2/2007 | Richards et al. | 700/276 |
| 2007/0043478 A1 * | 2/2007 | Ehlers | F24F 11/0012 700/276 |
| 2007/0055759 A1 * | 3/2007 | McCoy | G05B 19/042 709/223 |
| 2007/0069850 A1 | 3/2007 | Anderson, Jr. et al. | |
| 2008/0281472 A1 * | 11/2008 | Podgorny | F24F 11/0009 700/276 |

(Continued)

FOREIGN PATENT DOCUMENTS

EP 1152308 A2 11/2001
WO WO 0199078 A2 12/2001

(Continued)

OTHER PUBLICATIONS

Graham et al. v. John Deere Co. of Kansas City et al.; No. 11; Supreme Court of the United States; Oct. 14, 1965 Argued; Feb. 21, 1066, Decided; pp. 1-20.

(Continued)

*Primary Examiner* — Ajay Cattungal
(74) *Attorney, Agent, or Firm* — Reinhart Boerner Van Deuren P.C.

(57) ABSTRACT

A method of operating a building control system includes installing a plurality of network devices to a communications network. Each of the plurality of network devices performs a device operation. The method also includes assigning an identifier to each of the plurality of network devices. The identifier is based on the device operation and a device location. The method further includes communicating information and coordinating operations automatically among the plurality of network devices based on the identifier.

8 Claims, 3 Drawing Sheets

(56) References Cited

U.S. PATENT DOCUMENTS

| | | | |
|---|---|---|---|
| 2009/0103456 A1* | 4/2009 | Herrmann | H04L 12/12 370/254 |
| 2009/0131020 A1* | 5/2009 | van de Groenendaal | H04L 63/102 455/411 |
| 2009/0219145 A1* | 9/2009 | Wong | G01D 4/002 340/286.02 |

FOREIGN PATENT DOCUMENTS

| | | |
|---|---|---|
| WO | WO 03067392 A2 | 8/2003 |
| WO | WO 03090038 A2 | 10/2003 |
| WO | WO 2006015245 A2 | 2/2006 |
| WO | WO 2007024573 A2 | 3/2007 |
| WO | WO 2007024623 A2 | 3/2007 |
| WO | WO 2007118128 A2 | 10/2007 |

OTHER PUBLICATIONS

Peter Chipkin, Partner, AGP Support Group; BACnet Change of Value (COV); internet article; date last visited—Sep. 9, 2008; www.automatedbuildings.com/news/jun08/articles/chipkin/080529020708chipkin.htm.

* cited by examiner

BUILDING CONTROL SYSTEM

FIELD OF THE INVENTION

This invention generally relates to building control systems and, more particularly, to a building control system that communicates information and coordinates operations automatically among a plurality of network devices based on an identifier.

BACKGROUND OF THE INVENTION

Typically, the connection or binding of network devices to a building automation system or network is accomplished with the use of an external configuration tool or other binding device. Such configuration tools may require the expertise of a trained HVAC engineer who is knowledgeable both about the layout of the building control network and the specific operations performed by each network device in the network. In addition, many network devices are manufactured by various vendors and, therefore, may have to be customized to interoperate with devices manufactured by other vendors. This process can be expensive and time-consuming for a complex building automation network such as, for example, a commercial building network involving several network devices.

BRIEF SUMMARY OF THE INVENTION

In one embodiment, a method of operating a building control system includes installing a plurality of network devices to a communications network. Each of the plurality of network devices performs a device operation. The method also includes assigning an identifier to each of the plurality of network devices. The identifier is based on the device operation and a device location. The method further includes communicating information and coordinating operations automatically among the plurality of network devices based on the identifier.

In another embodiment, a building control system includes a communications network and a plurality of network devices operably coupled to the communications network. Each of the plurality of network devices communicates information on the communications network using a data communications protocol. The building control system also includes a control unit, an identification unit, and a communications unit, all of which are operably coupled to each of the plurality of network devices. The control unit is configured to control a device operation of each of the plurality of network devices. The identification unit is configured to assign an identifier to each of the plurality of network devices. The identifier is based on the device operation and a device location. The communications unit is configured to communicate information and to coordinate device operations automatically among the plurality of network devices on the communications network based on the identifier.

In yet another embodiment, a network device includes a control unit, an identification unit operably coupled to the control unit, and a communications unit operably coupled to the identification unit. The control unit is configured to control a device operation of the network device. The identification unit is configured to assign an identifier for the network device. The identifier is based on the device operation and a device location. The communications unit is configured to communicate information and to coordinate device operations automatically with another network device on a communications network based on the identifier.

Other aspects, e.g. the internal composition of a network device into network sender and receiver objects, the way in which sender and receiver objects are automatically associated, the use of predefined network objects, etc, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
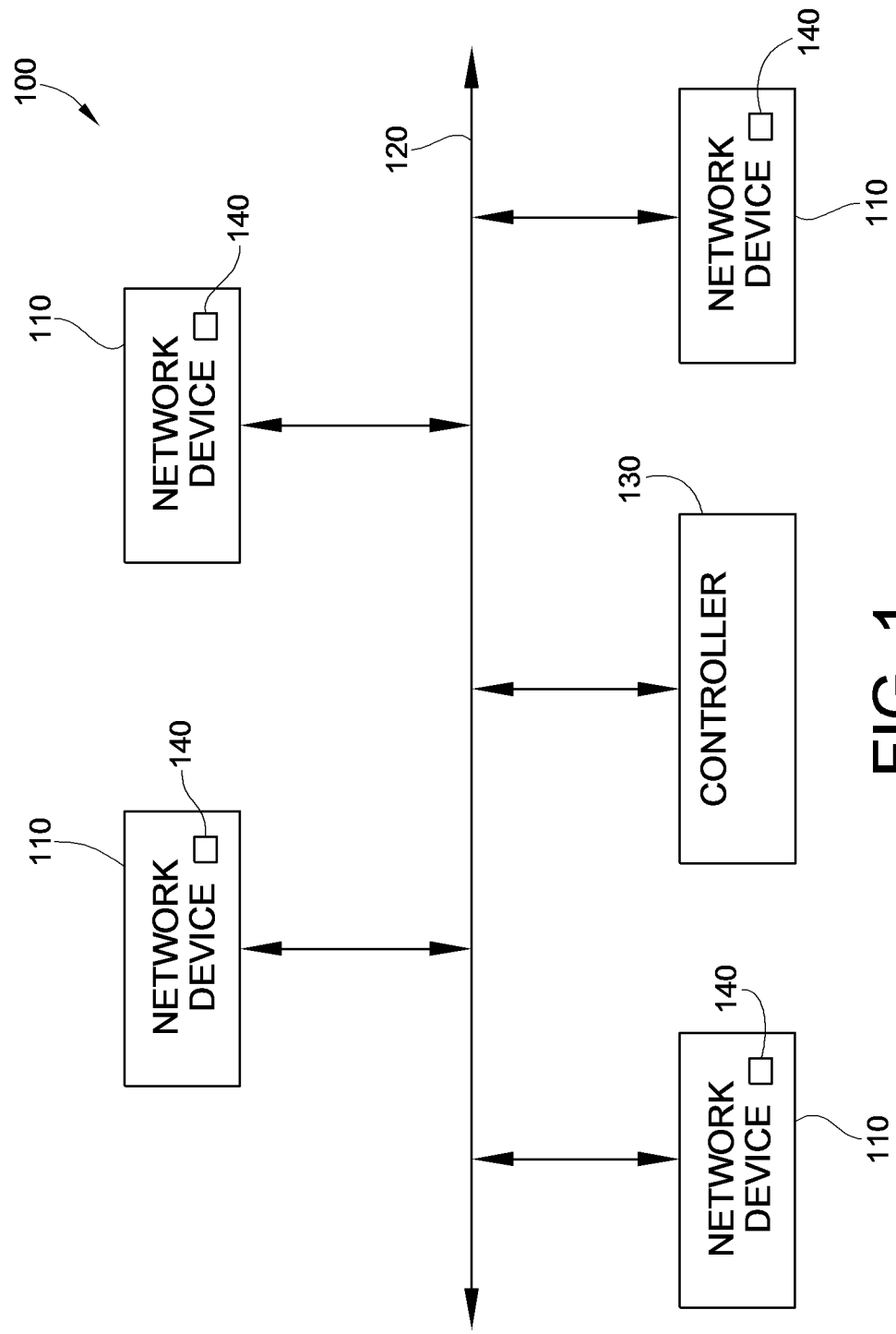
FIG. 1 is a block diagram of a building control system, including a plurality of network devices, according to one embodiment.

Referring to FIG. 1, a block diagram of a building control system 100 is shown. The building control system 100 may include, for example, a building automation and control network for one or more buildings in a residential, commercial, and/or industrial environment. As shown in FIG. 1, the building control system 100 includes a plurality of network devices 110 operably coupled to a communications network 120. The communications network 120 may include any type of wired and/or wireless communications media capable of transmitting data between the plurality of network devices 110 such as, for example, a twisted pair cable, an optical fiber, an AC power line, IR, RF, and the like. In one embodiment, the communications network 120 includes a network using an open-system, non-proprietary communications protocol such as, for example, the Building Automation and Controls Network (BACnet) protocol that allows for communications and interoperability among devices and subsystems developed by different vendors and manufacturers.

The building control system 100 may be subdivided into localized regions having a hierarchical relationship such as, for example, a campus, a building, a floor, a zone, and a room.

The building control system 100 may also include a controller 130 operably coupled to the communications network 120 such as, for example, a Building Management System (BMS) that monitors and controls the plurality of network devices 110. The controller 120 may be implemented on a personal computer or workstation within the building control system 100.

In one embodiment, each of the plurality of network devices 110 includes a device associated with a heating, ventilation, and air conditioning (HVAC) subsystem of a building, a zone, or a room of the building control system 100. For example, the plurality of network devices 110 may include a control device for an air conditioning unit, a furnace, a water heater, a boiler, a thermostat, and the like. It is to be understood, however, that the network devices 110 may include other automated subsystems such as, for example, lighting controls, security systems, fire and alarm systems, and the like.

Each of the plurality of network devices 110 includes network objects 140 such as, for example, a network sender object to provide data to other network devices 110 on the communications network 120, and a network receiver object to receive or consume the data provided by the network sender object. The network object 140 of each of the plurality of network devices 110 includes a predefined, unchangeable object type category, an object identifier category, an object name category, and an object unit category. Examples of predefined network objects 140 include outside air temperature, occupancy status, a schedule output, a setpoint, and the like. For example, a network device 110 for an air handling unit operation may include a network object 140 having an object name category of "outside air temperature," an object type category of "analog input," and an object unit category of "° F." The object identifier, which will be described in greater detail below, allows each of the network devices 110 to communicate information and coordinate operations with other network devices 110 within the building control system 100.

Figure 2:
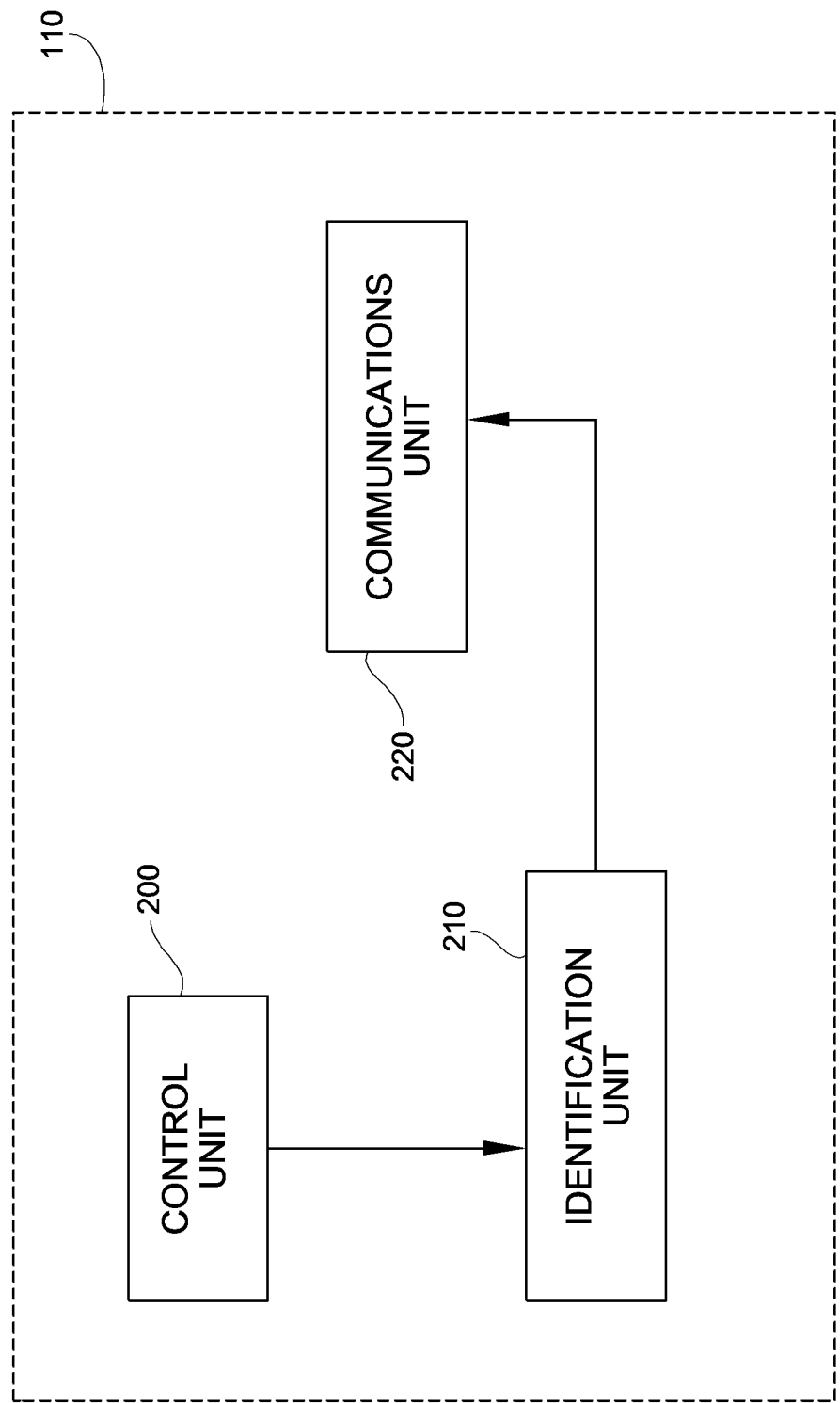
FIG. 2 is a block diagram of one embodiment of one of the plurality of network devices of FIG. 1.

Referring to FIG. 2, an embodiment of a network device 110 is shown. The network device 110 includes a control unit 200, an identification unit 210, and a communications unit 220. Although the control, identification, and communications units 200, 210, 220 are shown as separate units, it is to be understood that the functionalities of each of the units 200, 210, 220 may be implemented in one device.

The control unit 200 may include, for example, a control application that contains instructions or a routine for a particular network device 110 to perform a device operation within the building control system 100. Specifically, the control unit 200 determines the manner and identifies the other network devices 110 to communicate information and coordinate operations with to perform the specified device operation. Examples of device operations include an air handling unit operation, a variable air volume operation, a heat pump operation, a rooftop operation, a unit ventilator operation, and the like. The control application is typically reusable and created during the application engineering phase by a highly trained HVAC engineer without specific knowledge of the building or location where the control application will be used.

The control unit 200 of each of the plurality of network devices 110 is semi-autonomous in that the control unit 200 can perform most of the device operations without any coordination from other network devices 110. Indeed, the ability to perform the device operation is enhanced when the device has access to operational data from other devices. The control unit 200 of the device 110, therefore, provides a mechanism whereby the device can automatically access the relevant operational data in other devices. In addition, the control unit 200 for each of the plurality of network devices 110 is dedicated to a single, local responsibility or operation within the building control system 100.

The identification unit 210 is operably coupled to the control unit 200, and is configured to assign an identifier to each of the plurality of network devices 110. The identifier is based on the device operation and the device location within the building control system 100.

According to the BACnet communications protocol, each network device 110 may be given a logical address between 0 and $2^{22}-1$, which allows for more than 4 million available identifiers. As a result, the location and purpose of a network device 110 is identifiable based on the identifier. In this manner, the plurality of network devices 110 may perform device operations in which one network device 110 provides data for a particular network object 140 requested by another network device 110 based on the unique identifier. In one embodiment, each network device 110 will be assigned an identifier that includes a logical address having a range of 0 to 3,999,999. The identifier is divided into a plurality of level designations having a hierarchical relationship. Specifically, the plurality of level designations includes a universe level designation, a building level designation, a zone level designation, and a node level designation. As a result, each network device 110 is assigned an identifier having a format of "UBBZZNN," where "U" represents the universe level designation, "BB" represents the building level designation, "ZZ" represents the zone level designation, and "NN" represents the node level designation.

The universe level designation (U) includes an integer number from 0 to 3. In one embodiment, the universe level designation is set to zero, and can be used to prevent the hierarchically assigned device identifiers from clashing with other network devices 110. In addition, a network device 110 having one universe level designation does not communicate information or coordinate operations with network devices 110 having a different universe level designation. The identifiers having a universe level designation of "0" include 0 to 999,999. The identifiers having a universe level designation of "1" include 1,000,000 to 1,999,999. The identifiers having a universe level designation of "2" include 2,000,000 to 2,999,999. The identifiers having a universe level designation of "3" include 3,000,000 to 3,999,999.

The building level designation (BB) includes an integer number from 1 to 99. A building supervisor, which is assigned a non-zero BB with a zero zone level designation (ZZ) (described below), is a network device that manages building-wide operations and facilitates automatic binding to building-wide data. In addition, the building level designation may be subdivided into a building group (or campus) in which up to 9 building groups having 9 buildings each may exist. By subdividing the building level designation, a group of buildings may share access to certain data.

The zone level designation (ZZ) is an integer number from 0 to 99. The zone level designation of zero, however, is reserved for the building supervisor discussed above. A zone supervisor, which is assigned a non-zero ZZ with a zero node level designation (NN) (described below), is a network device that manages zone-wide operations and facilitates automatic binding to zone-wide data. As with the building level designation, the zone level designation may be subdivided into a zone group (or floor) in which up to 9 zone groups having 9 zones each may exist. By subdividing the zone level designation, a group of zones may share access to certain data.

The node level designation (NN) is an integer number from 0 to 99. The node level designation of zero, however, is reserved for the zone supervisor as discussed above, and is not assigned to a non-supervising network device 110. A node supervisor, which is assigned a non-zero NN is a network device that manages node-wide operations and facilitates automatic binding to node-wide data. As with the building and zone level designations, the node level designation may be subdivided into a node group in which up to 9 node groups having 9 nodes each may exist. Within each node group, the network device 110 with a node number of zero is the group supervisor.

By assigning each network device 110 an identifier that accounts for the hierarchical relationship between the network device 110 and other network devices 110 within the building control system 100, the identifier can be used at any time to determine the role or responsibility of the network device 110 within the building control system 100. Table 1 represents example hierarchical identifiers for the network devices 110.

TABLE 1

Example Hierarchical Device Identifiers

| Device Identifier | Description |
|---|---|
| 30411 | Node 11 in zone 4 of building 3 OR Node 1 of group 1 in zone 4 of building 3 |
| 1223344 | Node 44 in zone 33 of building 22 OR Node 4 in group 4 of zone 3 on floor 3 of building 2 on campus 2 (or any other similar combination) within universe 1 |
| 1223300 | The zone supervisor for zone 33 of building 22 within universe 1 |

After each network device 110 is assigned an identifier having a plurality of hierarchical level designations, a network device 110 may be able to recognize related network devices 110 based on the assigned identifier and a relative reference notation, which is an identifier that is not explicit, but that can be derived from the identifier of the referencing network device 110. Table 2 represents wildcard notations that can be used to replace explicit numbers in an identifier to specify relative reference notations.

TABLE 2

Wildcard Notations For Relative Reference Notations

| Digit Wildcard | Description |
|---|---|
| ? | Don't care. (Used to specify a range of devices.) |
| * | Substitute with my value. |
| + n | Substitute with my value incremented by n. |
| − n | Substitute with my value decremented by n. |

Examples of relative reference notations that will allow generic control applications to specify bindings to and from supervisor nodes, close peer nodes, and ranges of related nodes include the following: If a referencing network device 110 has an identifier (UBBZZNN) of 1010101, and a relative reference notation of *****00 representing a zone supervisor, then the translated identifier will be 1010100. If a referencing network device 110 has an identifier of 1010101, and a relative reference notation of * * * * * *+1, representing the next node in my zone, then the translated identifier will be 1010102. If a referencing network device 110 has an identifier of 1010101, and a relative reference notation of *****?? representing any node in my zone (or all nodes in my zone), then the translated identifier will be any or all network devices with identifiers in the range 1010100 to 1010199.

Figure 3:
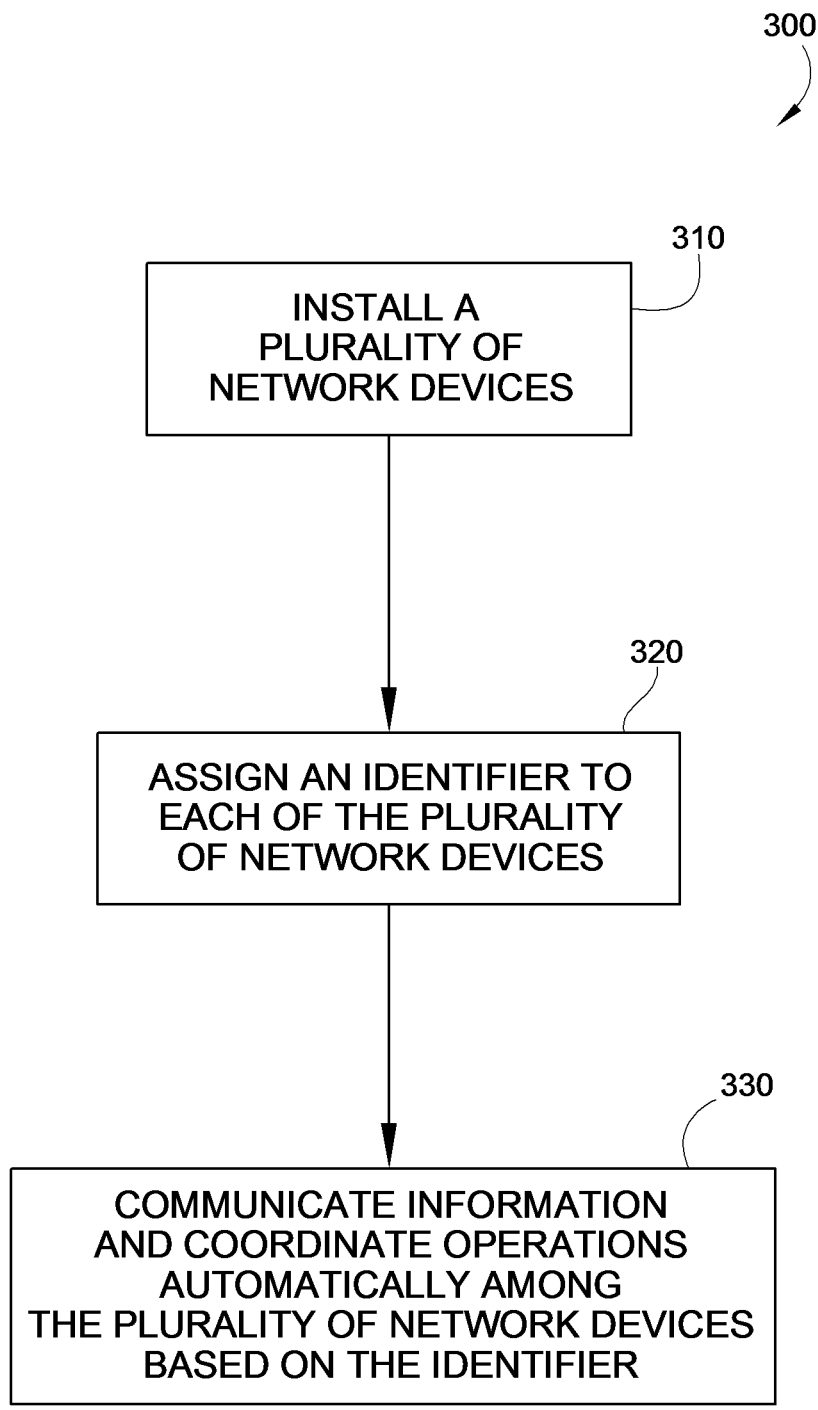
FIG. 3 is a flowchart of a method of operating a building control system according to one embodiment.

The communications unit 220 is operably coupled to the identification unit 200, and is configured to communicate information and to coordinate device operations automatically among the plurality of network devices 110 based on the identifier. In other words, the communications unit 220 of each network device 110 is configured to locate and coordinate with other, nearby network devices 110 on the communications network 120 based on the identifier. Referring to FIG. 3, a flowchart 300 of one embodiment of a method of operating the building control system 100 is shown. At block 310, a plurality of network devices 110 is installed to a communications network 120 by, for example, a systems engineer. Control then proceeds to block 320 in which the identification unit 210 of each of the network devices 110 assigns a unique identifier to each of the plurality of network devices 110. In one embodiment, each network device 110 will be assigned an identifier that includes a logical address having a range of 0 to 3,999,999. The identifier is divided into a plurality of level designations having a hierarchical relationship. Specifically, the plurality of level designations includes a universe level designation, a building level designation, a zone level designation, and a node level designation. Control then proceeds to block 330 in which the communications unit 220 of each of the network devices 110 communicates information and coordinates operations automatically among the plurality of network device 110 (i.e., automatically binds itself) based on the identifier.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of operating a building control system, the method comprising:
   installing a plurality of network devices to a communications network, wherein each of the plurality of network devices includes a control application for performing a device operation;
   assigning an identifier to each of the plurality of network devices, wherein the identifier is based on the device operation and a device location;
   communicating information and coordinating operations automatically among the plurality of network devices on the communications network based on the identifier; and communicating and coordinating operations automatically among the plurality of network devices based on a translated identifier derived from the identifier and a relative reference notation.

2. The method of claim 1, wherein assigning the identifier comprises assigning a logical address having a range of 0 to 3,999,999 to each of the plurality of network devices.

3. The method of claim 1, wherein assigning the identifier comprises assigning a plurality of level designations having a hierarchical relationship.

4. The method of claim 3, wherein assigning the plurality of level designations comprises:

assigning a universe level designation to each of the plurality of network devices;

assigning a building level designation to each of the plurality of network devices;

assigning a zone level designation to each of the plurality of network devices; and assigning a node level designation to each of the plurality of network devices.

5. The method of claim 3, wherein assigning the plurality of level designations comprises assigning a subdivision to at least one of the plurality of level designations.

6. The method of claim 3, wherein communicating information and coordinating operations comprises communicating information and coordinating operations automatically among network devices having common level designations.

7. The method of claim 1, further comprising developing the control application of each of the plurality of network devices separate from installation.

8. The method of claim 7, wherein developing the control application comprises developing a function related to heating, ventilation, and air conditioning (HVAC) systems.

* * * * *